United States Patent
Camacho et al.

(10) Patent No.: US 12,096,109 B2
(45) Date of Patent: *Sep. 17, 2024

(54) AUTO-FOCUS ACQUISITION FOR REMOTE FLYING TARGETS

(71) Applicant: Anduril Industries, Inc., Costa Mesa, CA (US)

(72) Inventors: Brian Marcin Camacho, Irvine, CA (US); Calvin Michael Hareng, Newport Beach, CA (US); Corey Martin Hass, Costa Mesa, CA (US); Forrest Nelson Iandola, San Jose, CA (US); Gokul Ganesh Subramanian, Watertown, MA (US); Nadav Ben-Haim, Newport Beach, CA (US); Adnan Esmail, Los Angeles, CA (US); Kevin Michael Christensen, Irvine, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,343

(22) Filed: Jan. 12, 2023

(65) Prior Publication Data

US 2023/0254570 A1 Aug. 10, 2023

Related U.S. Application Data

(63) Continuation of application No. 17/328,586, filed on May 24, 2021, now Pat. No. 11,606,492.

(51) Int. Cl.
*H04N 23/62* (2023.01)
*G01S 13/86* (2006.01)
*H04N 23/69* (2023.01)

(52) U.S. Cl.
CPC .......... *H04N 23/62* (2023.01); *G01S 13/867* (2013.01); *H04N 23/69* (2023.01)

(58) Field of Classification Search
CPC ........ H04N 23/62; H04N 23/69; H04N 23/67; G01S 13/867; G01S 13/72
USPC ...................... 348/169; 396/86, 89
See application file for complete search history.

(56) References Cited

U.S. PATENT DOCUMENTS

| | | | |
|---|---|---|---|
| 3,799,676 A * | 3/1974 | Chatterton | G01S 17/66 356/141.5 |
| 6,967,612 B1 | 11/2005 | Gorman | |
| 10,084,960 B2 * | 9/2018 | Pettegrew | H04N 5/2254 |
| 10,324,268 B2 * | 6/2019 | Nystrom | G03B 13/36 |
| 10,721,384 B2 | 7/2020 | Schwager | |
| 10,728,459 B2 | 7/2020 | Gumpert | |
| 11,034,299 B2 * | 6/2021 | Peterson | G06V 20/58 |

(Continued)

FOREIGN PATENT DOCUMENTS

| | | | | |
|---|---|---|---|---|
| CN | 106772338 A * | 5/2017 | ............ | G01S 13/06 |
| CN | 106772338 | 1/2020 | | |

*Primary Examiner* — Thai Q Tran
*Assistant Examiner* — Stephen R Smith
(74) *Attorney, Agent, or Firm* — Van Pelt, Yi & James LLP

(57) ABSTRACT

A system for automatically acquiring focus of remote flying objects (RFOs) includes an interface and processor. The interface is configured to receive a radar data and a lens temperature data. The processor is configured to determine a focal setting for a lens system based at least in part on the radar data and the lens temperature data; and provide the focal setting for the lens system.

16 Claims, 7 Drawing Sheets

(56) References Cited

U.S. PATENT DOCUMENTS

| | | | |
|---|---|---|---|
| 2008/0031610 A1* | 2/2008 | Border | H04N 5/232123 396/89 |
| 2011/0217030 A1* | 9/2011 | Muench | G03B 13/32 396/90 |
| 2015/0185585 A1* | 7/2015 | Kawai | H04N 9/04515 348/333.11 |
| 2016/0377830 A1 | 12/2016 | Zohrabyan | |
| 2018/0204331 A1 | 7/2018 | Omari | |
| 2019/0208112 A1* | 7/2019 | Kleinbeck | G01R 29/0892 |
| 2019/0327394 A1* | 10/2019 | Ramirez Luna | A61B 34/32 |
| 2020/0103499 A1* | 4/2020 | Preece | G06N 3/04 |
| 2020/0202288 A1 | 6/2020 | Buibas | |
| 2020/0344427 A1* | 10/2020 | Glasmacher | G06V 20/46 |
| 2021/0096255 A1* | 4/2021 | Turov | G01S 17/88 |
| 2021/0218901 A1* | 7/2021 | Kim | H04N 5/23218 |
| 2021/0250490 A1 | 8/2021 | Miao | |
| 2021/0281738 A1* | 9/2021 | Jeppsson | H04N 5/232133 |
| 2021/0350570 A1* | 11/2021 | Hibi | G06K 9/6273 |
| 2021/0383665 A1* | 12/2021 | Serino | G08G 5/0069 |
| 2022/0366167 A1* | 11/2022 | Desai | G06V 20/13 |
| 2023/0028792 A1* | 1/2023 | Cocaud | G08G 5/0039 |

* cited by examiner

AUTO-FOCUS ACQUISITION FOR REMOTE FLYING TARGETS

CROSS REFERENCE TO OTHER APPLICATIONS

This application is a continuation of U.S. patent application Ser. No. 17/328,586 entitled AUTO-FOCUS ACQUISITION FOR REMOTE FLYING TARGETS filed May 24, 2021 which is incorporated herein by reference for all purposes.

BACKGROUND OF THE INVENTION

Remote flying objects can be difficult or impossible to identify (e.g., whether the object is a bird, an airplane, a drone, etc.) and classify (e.g., the category, class, or model number of the airplane, drone, etc.) when the object is out of focus. In addition, it is difficult to maintain focus while tracking a remote flying object once the object has been determined to require continued surveillance.

BRIEF DESCRIPTION OF THE DRAWINGS

Various embodiments of the invention are disclosed in the following detailed description and the accompanying drawings.

DETAILED DESCRIPTION

Figure 1:
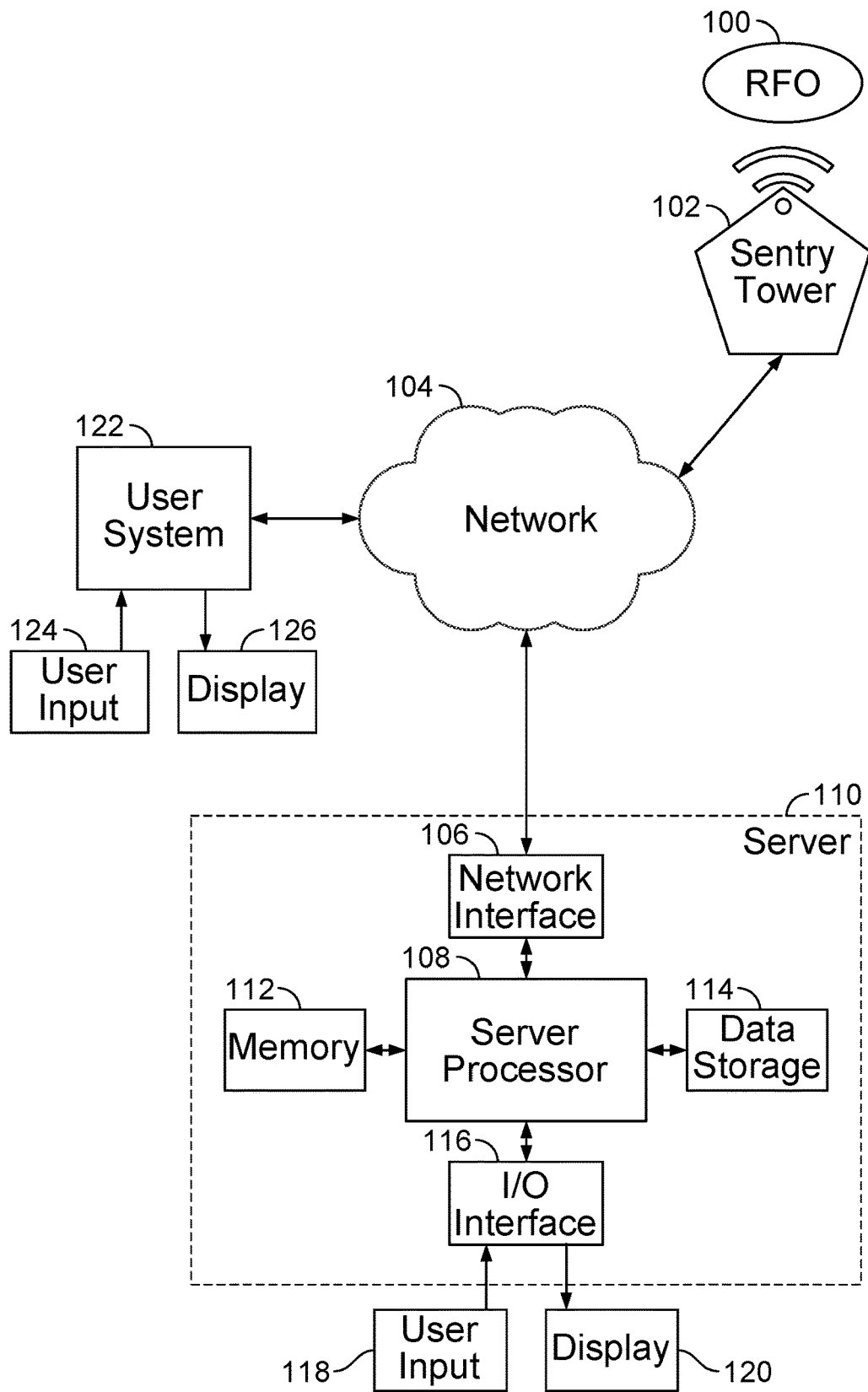
FIG. 1 is a block diagram illustrating an embodiment of a sentry monitoring system for remote flying targets.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for automatically acquiring focus of remote flying objects (RFOs) is disclosed (i.e., the 'RFO auto-focus system'). The system comprises an interface and processor. The interface is configured to receive a radar data and a lens temperature data. The processor is configured to determine a focal setting for a lens system based at least in part on the radar data and the lens temperature data; and provide the focal setting for the lens system.

A system for automatically maintaining focus while tracking remote flying objects is disclosed (i.e., the 'RFO tracking system'). The system comprises an interface and processor. The interface is configured to receive two or more images. The processor is configured to determine a bounding box for an object in the two or more images; determine an estimated position for the object in a future image; and determine an estimated focus setting and an estimated pointing direction for a lens system.

In some embodiments, the systems further comprise a memory that is coupled to the processor and configured to provide the processor with instructions. In some embodiments, the system further comprises an interface that is coupled to the processor and is configured to receive input for the processor or provide output from the processor.

The disclosed systems for automatically acquiring and maintaining focus while tracking remote flying objects (i.e., the RFO auto-focus system and the RFO tracking system, or together, 'the RFO systems') are used to monitor a surrounding area (e.g., to monitor and protect a geo-fenced area against incoming threats) using sensors in one or more sensor systems (e.g., sentry towers, sentry stations, drones, drone stations, mounted on vehicles, mounted on humans, etc.). The RFO systems detect an object (e.g., using a radar data from a radar unit, an image data from a camera, a fusion of data or information derived from the one or more sensor systems, etc.) and make a determination of whether the object is a threat and/or requires additional tracking and surveillance.

For example, a fusion of radar images with camera images generates a more accurate determination of RFO location than the individual sensors on their own. This is because radar can determine RFO range with great certainty, but not so for elevation or azimuth; and camera images can be used to determine RFO elevation and azimuth with great certainty, but not so for range. In some cases, one signal is occluded but another is not (e.g., a visible or IR signal is occluded by clouds, but a radar signal is not), and the fusion of radar images with camera images enables tracking by using just one signal in the event that another is occluded. For example, the RFO tracking system uses radar data to continue tracking the RFO while it is behind a cloud, but also uses a tracker program (e.g., a visual tracking program based on optical flow) in during the occlusion to compute the RFO trajectory based on prior sensor inputs in order to reacquire the RFO in the camera frame once it clears the cloud cover. In some embodiments, the camera output is streamed to a system user (e.g., live video is streamed to a system user). In some embodiments, the radar data comprises a radar range distance. In some embodiments, the radar data comprises an azimuth angle and an elevation angle.

In some embodiments, determining an estimated position of the RFO includes determining a prior estimated position (e.g., using the motion model to determine predicted future as well as predicted past position so that the past position can be used to validate the motion model's prediction accuracy). In some embodiments, the prior estimated position is evaluated with respect to a prior actual position in an image of two or more images. For example, camera images that correspond to previous times and locations of the RFO are used to determine the RFO flight path and rate of change in order to predict a future RFO trajectory and location.

The RFO systems detect and track the object using a plurality of sensor systems. The sensor systems comprise one or more sensors and a processor that are networked together. Each sensor system contributes raw sensor information from its sensors or derived sensor information that has been processed from the raw sensor information towards detecting the object. The raw sensor information and derived sensor information from the plurality of sensor systems is fused to create a coherent and comprehensive picture of the object. This data processing is determined at one processor (e.g., at a server, at a sensor system, at a counter drone, etc.) or using multiple processors (e.g., some fusion/derivation performed at a sensor system, some at a server, and some at a counter drone).

In some embodiments, the processor is further configured to determine that there is an object in the image that is in focus and indicate that the object is in focus. In some embodiments, determining that the object in the image is in focus uses a neural network classifier or an edge detection algorithm. In some embodiments, the processor is further configured to determine that there is an object in the image that is not in focus and indicate that the object is not in focus. In some embodiments, the processor is further configured to change the focal setting for the lens until the object is in focus in response to determining that the image is not in focus. In some embodiments, wherein the processor is unable to determine that there is an object in the image, the processor is further configured to indicate that it is unknown whether there is the object in the image. In various embodiments, in response to being unable to determine that there is an object in the image, the processor is further configured to change the focal setting, zoom setting, and/or a pointing direction of the lens system.

In various embodiments, the raw sensor information and/or derived sensor information from the plurality of sensor systems is fed into a computer model (e.g., a neural network model) and used to generate one or more bounding boxes that outline and define the extent and/or shape of one or more possible RFOs detected by the sensor network. In various embodiments, one or more computer models are used to identify and/or classify one or more objects within the one or more bounding boxes (e.g., within one or more bounding boxes generated from one or more camera images). For example, a camera image is fed into a computer vision model that determines that there are three possible objects in the image and outlines each with a bounding box (e.g., bounding boxes 1, 2, and 3) while another computer model determines that bounding box 1 comprises a bird, bounding box 2 comprises a commercial aircraft, and bounding box 3 comprises a drone carrying a payload of unknown origin. In response to classifying the objects in the three bounding boxes of this example, the tracker program of the RFO tracking system, for example, determines that the RFO tracking system should continue to track the drone identified in bounding box 3 and not track the RFOs in bounding boxes 1 and 2.

In some embodiments, the bounding box is the smallest possible rectangle fully enclosing a detected object. In various embodiments, the location of each bounding box within the greater image is determined and used for tracking and/or classification purposes.

In some embodiments, a radar system (e.g., a radar system mounted on a sentry tower) is used to initially detect the presence of an RFO. In response to detecting an RFO, an image (e.g., an infrared image, a visible image, etc.) is acquired of the RFO (e.g., using a camera mounted on the sentry tower). In the event that the image is out of focus, it can be difficult to identify or classify the RFO. For example, it can be difficult to determine whether the RFO is a bird, an airplane, or a drone; the category, class, sub-class, and/or model number of the RFO; whether the RFO is carrying a payload; whether the payload comprises a possible threat; etc.

In various embodiments, the identification and/or classification of the RFO is done by human interpretation and/or autonomously by one or more processors of the RFO systems (e.g., using computer vision). When the focus is poor, computer vision often fails to classify the target. And, when focus is poor, a human operator's eyes also cannot classify the target.

In the event that the camera image is sufficiently out of focus to not allow classification of the RFO, the RFO auto-focus system adjusts the focus setting, the zoom setting, and/or the pointing direction of the camera to acquire a sufficiently in-focus image to enable classification of the detected RFO (e.g., to classify the RFO above a threshold level of confidence). In some embodiments, a pointing direction is set for the lens system based at least in part on the azimuth angle and the elevation angle (e.g., as provided by radar data).

In some embodiments, the camera used to generate an image of the RFO has a dual lens system (e.g., a focusing lens and a zoom lens). Each of these lenses can be controlled programmatically—specifically, a software program tells the lenses how to move, and electric motors reposition the lenses. Given the distance from the sentry tower to the RFO—for example, 1 kilometer (km), 2 km, 3 km, etc. (e.g., as measured by radar signal strength)—an estimated zoom setting for the zoom motor is automatically selected (e.g., using a look up table or a calculation). Next, an autofocus procedure is initiated (e.g., by the RFO auto-focus system processor).

The RFO auto-focus system processor comprises three subsystems: a range-to-focus module, an in-focus classifier, and a focus motion planner. The range-to-focus module estimates the lens position for ideal focus based on three input variables: target distance (e.g., as determined from the radar data), zoom lens position (e.g., based in part on the radar data and/or based in part on a radar cross section of the RFO from the radar data), and temperature of the focus system inside the camera enclosure.

While many commercially available camera systems provide a basic range-to-focus module that accounts for target distance and zoom lens position, the typical range-to-focus systems perform adequately for ranges that are close to the lens systems (e.g., within 10 feet, within 20 feet, etc.). However, the range-to-focus systems do not perform well at long distances (e.g., 500 feet and greater distances) and often do not adequately focus objects (e.g., for identification or classification) at these distances. The disclosed RFO autofocus system is an improvement over these other systems in that it accounts for focal discrepancies caused by varying temperatures within the camera lens enclosure. For example, using commercially-provided classified range-to-focus values to image a P4 rotor-wing drone at a range of three kilometers results in out-of-focus images. But, by predetermining the mathematical relationship between the temperature within the camera lens enclosure and the ideal focus motor position (e.g., a linear relationship), a focus motor offset can be added to the commercially-provided range-to-focus values to provide the correct focus motor settings without needing to search (e.g., for every degree above 31° C., increase the focus motor position by 80 units, or for every degree below 31° C., decrease the focus motor position by 80 units).

The RFO tracking system utilizes one or more of the three subsytems of the RFO auto-focus system and also a tracker module and a track prioritizer. As in the RFO auto-focus system, RFOs are initially detected by analyzing radar data for the presence of an object (e.g., using an object detector module in the sentry tower processor).

In some embodiments, object detection and tracking utilize a high-frame rate radar unit to detect and track an RFO (e.g., a frame rate of 24 frames/second (fps), 30 fps, 100 fps, 180 fps, or any other appropriate high-frame rate). In some embodiments, object detection and tracking utilize a lower-frame rate radar unit to detect and track an RFO frame (e.g., a frame rate of 6 fps or 12 fps, or any other appropriate low frame rate). In some embodiments, visual tracking by a camera is used to complement radar tracking, wherein the camera is operated at a faster frame rate than the radar unit (e.g., 2×, 3×, 4×, or any appropriate faster frame rate). For example, a radar unit capable of 6 frames/second complemented by a higher frame rate camera unit (e.g., operating at 24-30 frames/second) enables a lower system hardware cost compared to using a higher frame rate radar unit. Additionally, a lower operational cost is enabled due to the lower computational overhead required to process the slower frame rate radar unit. When used together, the two units provide a three-dimensional image used to accurately determine RFO position at any point in time. The use of visual images from a camera, in addition to radar object detection and/or radar object classification, also reduces possible false positives and/or incorrect identification and/or classification as performed by a radar unit alone.

When the RFO is sufficiently in focus that it can be classified (e.g., by an object classifier module in the sentry tower processor), the task turns to the track prioritizer module to decide whether to continue tracking the RFO. For example, in the event that the RFO is identified as a bird or commercial aircraft (i.e., not a threat), the track prioritizer is programmed to ignore the RFO, and move to the next RFO on its list. In various embodiments, the track prioritizer list is prioritized based on the size, speed, range, altitude, location, or any other appropriate ranking of RFO priority. In some embodiments, the decision whether to continue tracking the RFO is made by a human operator of the system.

In the event that the RFO is identified as a possible threat that warrants continued surveillance (e.g., an incoming drone carrying an unknown payload), the tracker module of the RFO tracking system uses bounding boxes generated for two or more RFO images to determine a trajectory of the RFO (e.g., bounding boxes as generated by the object detector using a deep learning model). In various embodiments, in response to determining the trajectory of the RFO, the tracker module determines an estimated focus setting, zoom setting, and/or pointing direction for the camera lens system to maintain the RFO in the camera field of view.

In some embodiments, in response to an RFO not being identifiable in a recent image of the two or more images over a period of time, tracking is changed to a next priority RFO. In some embodiments, in response to an RFO not being identifiable in a recent image of the two or more images and the RFO being identifiable in a radar data, tracking is indicated to reacquire the RFO. In some embodiments, in response to an RFO being identifiable in a recent image of the two or more images and the RFO not being identifiable in a radar data, it is indicated to maintain tracking. In some embodiments, maintaining tracking includes indicating range data is suspect due to loss of the RFO in the radar data.

In some embodiments, the system improves focus and tracking systems by enabling long distance automatic focusing and tracking by using temperature compensation and/or fusion of sensor information (e.g., radar information) to improve focus and tracking performance.

In some embodiments, the RFO tracking system is an improvement by having a number of advances over other systems that are in widespread use: 1) the system automatically searches for objects in the sky and classifies them—for example, the system automatically identifies objects that constitute potential threats and alerts the human operator of the system on a dashboard on a computer screen; 2) the system automatically fuses data from a plurality of sensors, relieving a human operator of needing to observe a given object and then manually aiming and/or focusing the camera; 3) the system gracefully handles the limitations of sensors—for example, radar accuracy can degrade when an object travels tangentially to radar, and in this situation the system is still able to follow the object using the camera; and 4) the system enables an operator to monitor the system remotely from a computer in any network connected location.

FIG. 1 is a block diagram illustrating an embodiment of a sentry monitoring system for remote flying objects. In the example shown, remote flying object RFO 100 is detected by sentry tower 102 which communicates raw sensor data and/or derived sensor information via network 104 to user system 122 and via network interface 106 to server processor 108 housed within server 110. In various embodiments, server processor 108 and/or a processor in sentry tower 102 use the received raw sensor data and/or derived sensor information to autonomously determine whether RFO 100 comprises a threat. For example, using a radar data and a lens temperature data received from sentry tower 102, the processor of server 110 and/or a processor of sentry tower 102 determine and provide a focal setting to the lens system of a camera mounted on sentry tower 102 to generate two or more in-focus images of RFO 100. In response to receiving the two or more in-focus images of RFO 100, server processor 108 and/or the processor of sentry tower 102 generate a bounding box for each image of RFO 100 in the two or more images, and determine (i) an estimated position for RFO 100 in a future image, (ii) an estimated focus setting for the camera mounted on sentry tower 102, (iii) an estimated zoom setting for the camera mounted on sentry tower 102, and/or (iv) an estimated pointing direction for the lens system of the camera mounted on sentry tower 102 so as to provide continued tracking of RFO 100 while maintaining focus. Server processor 108, the processor of sentry tower 102, and/or user of user system 122 identifies and/or classifies RFO 100 within the bounding boxes of the two or more images of RFO 100, estimates a future trajectory of RFO 100, and determines whether RFO 100 comprises a threat. For example, it is determined that RFO 100 is a bird—for example, it is determined that RFO 100 is a swallow (e.g., an African or European swallow)—that is headed towards a geo-protected area, and thus does not comprise a threat. In another example, it is determined that RFO 100 is a drone carrying an unknown payload that is headed towards a geo-protected area, and therefore comprises a possible threat.

In various embodiments, in response to determining that RFO 100 comprises a threat, server processor 108 and/or a user of user system 122 provide surveillance instructions to sentry tower 102 via network 104. For example, surveillance instructions comprise instructions for whether sentry tower 102 is to continue or discontinue monitoring and tracking RFO 100, whether sentry tower 102 is to monitor and track multiple RFOs, how to prioritize monitoring and tracking multiple RFOs, whether to discontinue all tracking and place sentry tower 102 in scanning and monitoring mode, whether to power up or power down sentry tower 102, whether to place sentry tower 102 in standby mode, or any other appropriate instructions.

In various embodiments, autonomous control of sentry tower 102 enables more rapid reaction to local sensor information (i.e., local to sentry tower 102) in order to improve the speed of detection, identification, and/or classification of a threat RFO while still using information from server processor 108 and/or a user of user system 122 (e.g., information comprising a search strategy, a focus motion plan, or any other appropriate instructions used to respond to an identified threat). In some embodiments, sentry tower 102 is under full autonomous control where all instructions used to respond to an identified threat are local to sentry tower 102. In various embodiments, sentry tower 102 is under complete or partial control of a system user (e.g., via user input 124 or user input 118).

In some embodiments, information from server 110 to sentry tower 102 is provided by a user via user input 118 (e.g., information comprising computer-coded response strategies, sensor activation or motion plans, tower status queries, diagnostic requests, maintenance instructions, or any other appropriate information). In various embodiments, information provided by a user to server 110 (e.g., via input/output I/O interface 116 and viewed via display 120) is stored in memory 112 and/or data storage 114.

In various embodiments, information from sentry tower 102 is provided to a user via user system 122 (e.g., as viewed via display 126) and/or server 110 (e.g., as viewed via display 120). For example, information from sentry tower 102 comprises radar data; camera video; still or live images of one or more RFOs being monitored (e.g., one or more RFOs within their respective bounding boxes); a measurement of RFO focus quality; the identify and/or classification of the RFO; the RFO priority rank or threat level; the size, speed, range, altitude, or location of the RFO; a projected future RFO trajectory; a previous RFO trajectory; or any other appropriate information about the RFO.

In various embodiments, network 104 comprises a wired and/or wireless communication path. Examples of wireless communications useful to practice the disclosed invention comprise radio (RF) and microwave frequencies—both satellite and/or terrestrial—infrared (IR), free-space optical, sonic, ultrasonic, and electromagnetic induction (e.g., a short-range RFID tag). Examples of wired communication methods comprise twisted-pair, coaxial, and fiber optic cables. In various embodiments, network 104 comprises wired and/or wireless communication networks comprising standard, hybrid, and/or proprietary networks (e.g., a local area network, a wide area network, a virtual private network, a mesh, etc.). In some embodiments, network 104 is not required and direct communication links enable communication between system components (e.g., sentry tower 102, server 110, user system 122, additional sentry towers and/or drone stations, etc.).

Server processor 108 and/or a processor in sentry tower 102 allow for various approaches to generate derived sensor information and determine whether RFO 100 is in focus, is being properly tracked, whether or not RFO 100 comprises a threat, etc. In some embodiments, automated learning, based on adaptive neural networks, or other algorithmic approaches (e.g., image recognition, predictive modeling, etc.), are employed by server processor 108. In some embodiments, automated learning uses data collected from detected RFOs that are determined to not be a threat to more quickly and definitively determine that an RFO is not a threat—for example, a neural network is trained on a training set of confirmed non-threat RFOs to appropriately identify that an RFO is not a threat. For example, an image profile of a bird has unique characteristics that differ from any type of aircraft or drone (e.g., wing shape, wing markings, body shape, body markings, tail characteristics (e.g., length, shape, or color, etc.), wing rhythm, flight path, sound, and/or whether it is part of a flock).

Server processor 108 receives instructions stored on and/or provided by memory 112, along with optional user input 118 via I/O interface 116, and/or user input 124 via user system 122. Memory 112 stores raw sensor data and/or derived sensor information from sentry station 102; sentry station 102 status (e.g., online, offline, a malfunction indication, etc.); sentry station 102 status information (e.g., a battery level information); location or trajectory information of RFO 100; or any other appropriate information to facilitate operation of the sentry monitoring system.

Data storage unit 114 is used for storing sentry monitoring system (FIG. 1) initial configuration information; maintenance records; system logs; event logs; or any other appropriate information to facilitate operation and upkeep of the sentry monitoring system. Initial sentry monitoring system configuration information comprises available payload information for sentry tower 102 (e.g., available sensor hardware such as a camera, a radar sensor, a lidar sensor, an audio sensor, a laser illuminator, or any other appropriate payload); threshold determination levels (e.g., a zoom threshold level, a probability threshold level, a confidence threshold level etc.); known or suspected RFO profiles (e.g., an identification or classification profile, an image profile, a vibration profile, a radio frequency (RF) profile, and/or a sound profile etc.); RFO threat levels; or any other appropriate information to facilitate operation of the sentry monitoring system.

A suspected RFO profile comprises a profile that exhibits characteristics similar to a known RFO (e.g., a size, a velocity, a sound frequency, RF emissions, etc.), but is not a known image profile or other unique and definitive RFO profile. In various embodiments, known RFO profiles comprise various types of birds, commercial aircraft, military aircraft, threat drones, non-threat drones, or any other appropriate type of RFO.

Figure 2:
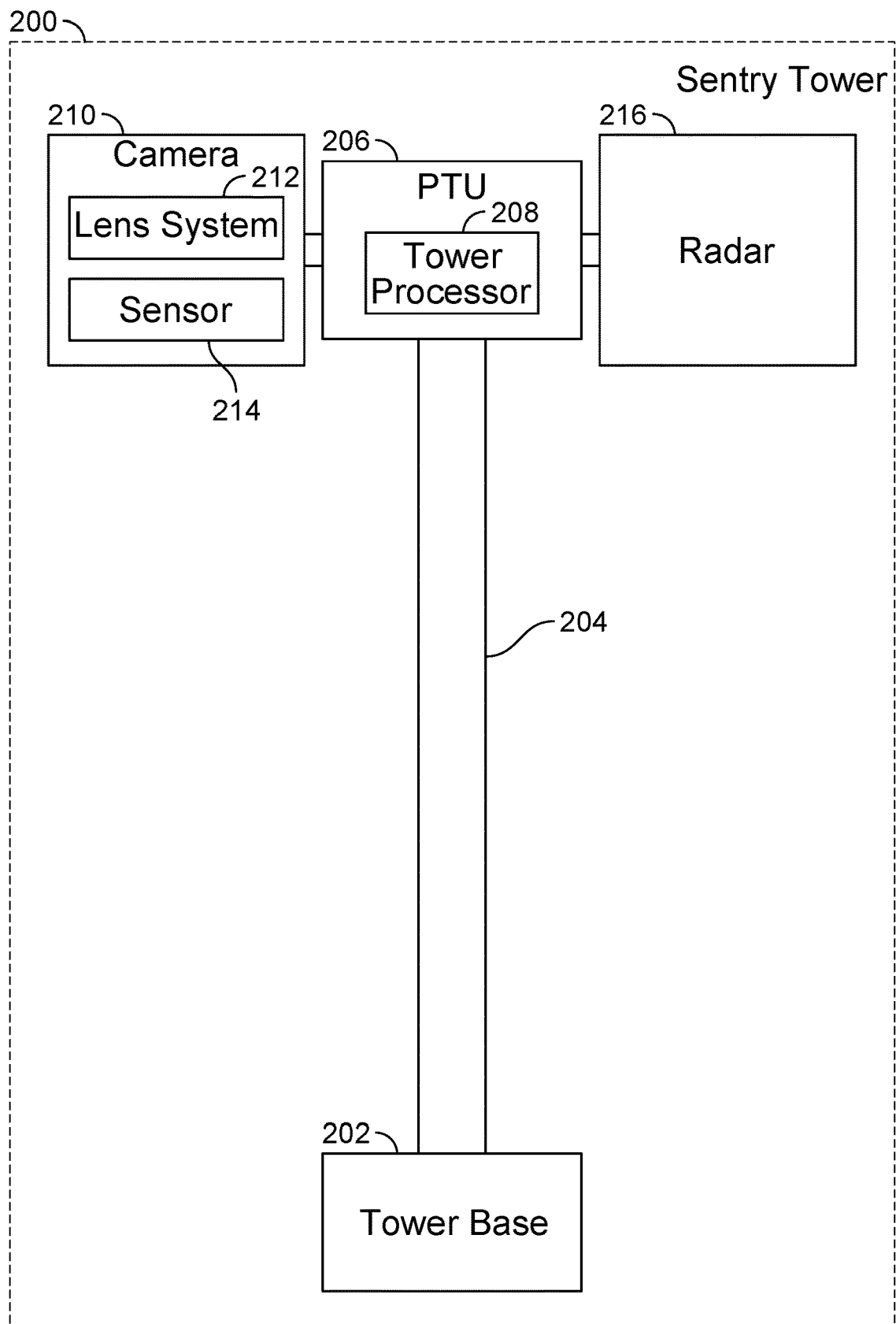
FIG. 2 is a block diagram illustrating an embodiment of a sentry tower.

FIG. 2 is a block diagram illustrating an embodiment of a sentry tower. In some embodiments, sentry tower 200 is used to implement sentry tower 102 of FIG. 1. In the example shown, sentry tower 200 comprises tower base 202, pan tilt unit (PTU) support 204, PTU 206, camera unit 210, and radar unit 216. A PTU is a component of a sentry tower or station (e.g., a fixed and/or mobile station) used to directionally position and/or scan attached payloads (e.g., a camera, a radar sensor, a lidar sensor, an audio sensor, etc.). In some embodiments, tower base 202 is a fixed and permanently mounted installation (e.g., mounted onto a concrete pad, piers, or other platform type, attached with nuts and bolts, welded, or any other appropriate method of mounting or attachment).

In some embodiments, tower base 202 is a temporary installation (e.g., a collapsible tripod support, a mobile base mounted on a trailer with wheels, etc.). In various embodiments, tower base 202 houses one or more batteries, one or more computers and/or processors, a communication module, or any other appropriate sentry tower data storage, power, communication, or networking resources.

In some embodiments, PTU support 204 comprises a cylindrical support, a rigid hollow tube (e.g., an aluminum tube), a support with a non-cylindrical cross section (e.g., a square cross section, a rectangular cross section, an elliptical cross section, etc.), or any other appropriate support. Data and power to the various payloads attached to PTU support 204 are transmitted via cables that run from tower base 202 (e.g., via a wiring harness through PTU support 204 and one or more slip rings) to the payloads at the sides and/or top (e.g., camera unit 210 and radar unit 216).

PTU 206 provides rapid and precise positioning of the mounted sensor payloads so that sentry tower 200 can acquire sufficient and appropriate data for monitoring and tracking. This is especially important in the case of a sentry monitoring system for remote flying objects to allow rapid determination whether a detected object is a threat, and if determined to be a threat, provide precise and real-time tracking information.

In some embodiments, the PTU comprises two mounts on opposite sides of the cylindrical support (e.g., to mount sensor payloads useful to monitoring and protecting a surrounding area). In the example shown, camera unit 210 is mounted on the left side of PTU 206 and radar unit 216 is mounted on the right side of PTU 206. In some embodiments, the two mounts are coupled to move together around a common tilt axis. In some embodiments, the PTU comprises more than two mounts. In some embodiments, the two or more mounts are independently controllable for tilt position.

In various embodiments, a mount of the two or more mounts is coupled to one or more of the following payloads: a camera, a radar sensor, a lidar sensor, an audio sensor, a laser illuminator, or any other appropriate payload. In some embodiments, any tilt mount includes a slip ring so that tilt motion is not limited. In various embodiments, stepper motors are used to position PTU 206 and/or its associated mounts and are controlled by smooth velocity-controlled proportional-integral-derivative (PID) controllers. In some embodiments, the PID controllers match the stepping rate of the stepper motors with the frame rate of the camera (e.g., 30 Hz).

In various embodiments, the top of the PTU is stationary to allow stacking of multiple PTUs and/or the placement of a unit with fixed orientation (e.g., a radio frequency antenna or optical communication link that needs a specific orientation for optimal functioning).

In various embodiments, the PTU receives positioning instructions from a network (e.g., a wired and/or wireless computer network), a local computer (e.g., a local computer mounted on the unit comprising tower processor 208), and/or user interface that provides the unit with positioning instructions—for example, positioning instructions from a remote server or user, or during automatic mode (e.g., tracking, auto scanning, etc.).

Camera unit 210 comprises lens system 212 and sensor 214. In some embodiments, camera unit 210 comprises a medium-wave IR (MWIR) camera (e.g., a long-range cooled thermal camera operating in the 3 to 5 micrometer (µm) wavelength range). MWIR thermal cameras are capable of achieving long-range detection for thermal infrared surveillance cameras and are often cooled via a cyrocooler, allowing them to offer extreme range with high contrast and little noise. In various embodiments, camera unit 210 comprises a camera using visible or any other appropriate wavelength of light. Lens system 212 comprises a focusing lens and zoom lens system that focuses an image of an RFO onto sensor 214. Sensor 214 converts an IR image of the RFO received by its photosensor element (e.g., an indium antimonide (InSb) photosensor) into a digital signal for transmission to a data processor (e.g., tower processor 208). In some embodiments, sensor 214 comprises an MWIR image sensor. In some embodiments, camera unit 210 comprises a visible spectrum camera.

In various embodiments, radar unit 216 generates radar data (e.g., RF time of flight data) that is used to create an image of the RFO, or to determine the range, altitude, position, location, velocity, and/or radar cross section (RCS) of the RFO. In some embodiments, the RFO's trajectory is also estimated by tracking the RFO with radar unit 216. In various embodiments, radar data from radar unit 216 is used to generate a composite or fused image of the RFO (e.g., any combination of optical, radar, lidar, and IR images). In various embodiments, imaging radar techniques (e.g., synthetic aperture radar) and/or scanning or whole field lidar imaging techniques are used to generate 2-D and/or 3-D images of an RFO. In various embodiments, images of an RFO target comprise still images or video images that include some portion, or all, of an RFO.

For example, an RFO is detected by radar unit 216 which communicates raw radar data to tower processor 208. In response to receiving raw radar data of a detected RFO from radar unit 216, tower processor 208 determines a temperature within lens system 212 (e.g., by querying a camera service component that communicates with and controls camera 210). Using the received radar data and lens system temperature data, tower processor 208 determines and provides a focal setting to lens system 212 of camera 210 and instructs camera 210 to generate two or more in-focus images of the RFO (e.g., via the camera service component). In response to receiving the two or more in-focus images of the RFO, tower processor 208 generates a bounding box for each image of the RFO in the two or more images, and determines (i) an estimated position for the RFO in a future image, (ii) an estimated focus setting for lens system 212, (iii) an estimated zoom setting for lens system 212, and/or (iii) an estimated pointing direction for lens system 212 so as to provide continued tracking of RFO while maintaining focus (e.g., in response to receiving instructions from a system user that the RFO warrants continued monitoring and tracking). Tower processor 208 identifies and/or classifies the RFO within the bounding boxes of the two or more images, estimates a future trajectory of the RFO, and determines whether the RFO comprises a threat—for example, by comparing the two or more images to a database of known threat RFOs (e.g., a database loaded into a memory or data storage device that is connected to tower processor 208).

Figure 3:
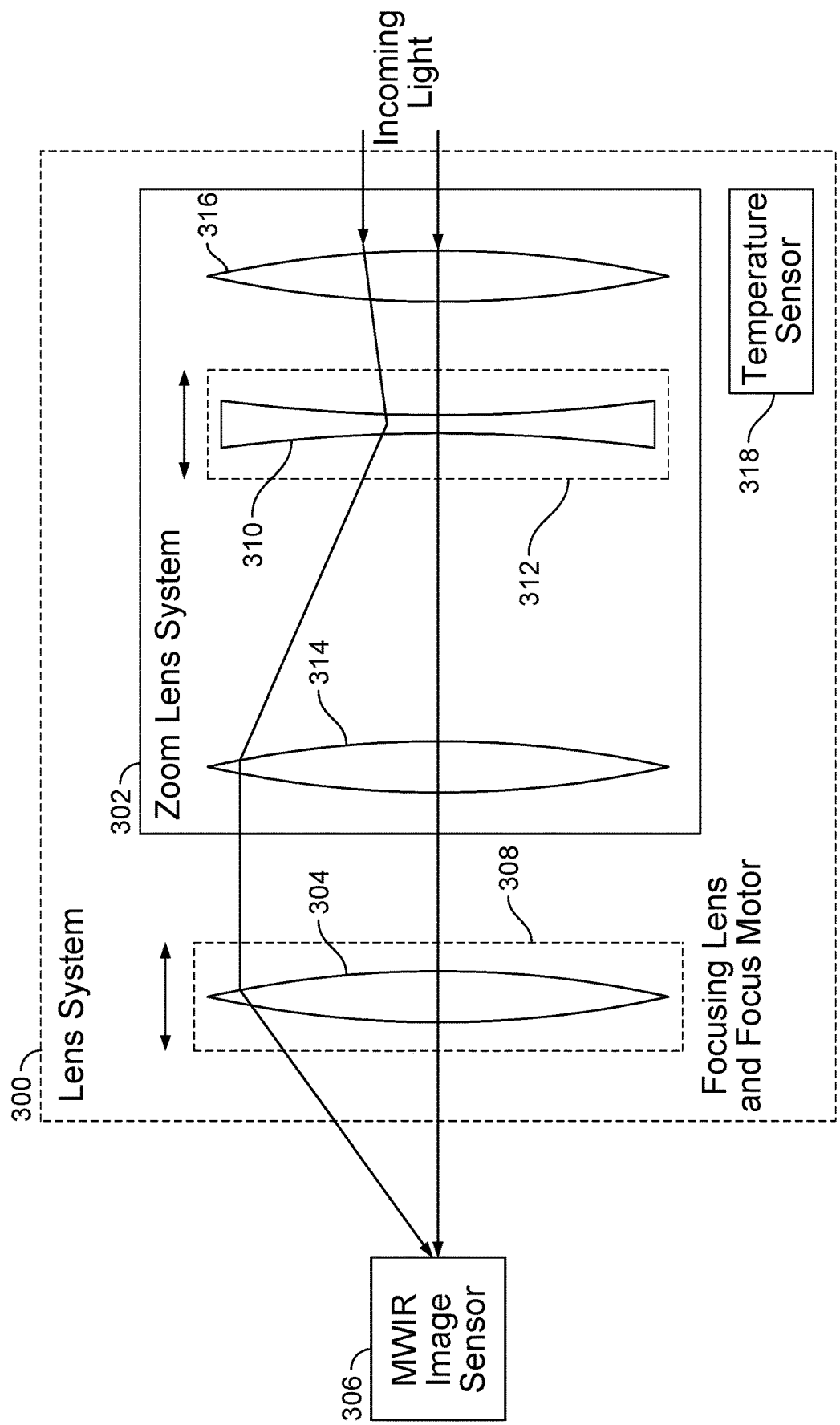
FIG. 3 is a block diagram illustrating an embodiment of a lens system.

FIG. 3 is a block diagram illustrating an embodiment of a lens system. In some embodiments, lens system 300 is used to implement lens system 212 of FIG. 2. In the example shown, lens system 300 comprises zoom lens system 302, focusing lens 304, MWIR image sensor 306, focus motor 308, and temperature sensor 318. Focus motor 308 moves focusing lens 304 so that an image of an RFO converges on MWIR image sensor 306. In the example shown, zoom lens system 302 comprises fixed lens 314, fixed lens 316, movable lens 310, and zoom motor 312. Zoom motor 312 moves movable lens 310 to produce a range of lens system focal lengths. For example, lens system 300 comprises focal lengths ranging from 15 millimeters (mm) to 456 mm, 26 mm to 275 mm, 35 mm to 690 mm, 44 mm to 909 mm, 45 mm to 900 mm, 80 mm to 960 mm, or any appropriate range of focal lengths, and horizontal fields of view for the zoom lens system that range from narrow to wide (e.g., 0.5 to 45 degrees).

MWIR image sensor 306 comprises an imaging sensor equivalent to a CMOS sensor in a consumer grade camera (e.g., a flat rectangular grid of photo sensitive cells.). The sensor signal is then read out of the sensor and transmitted to a data processor (e.g., to the sentry tower processor).

Temperature sensor 318 measures the temperature inside the enclosure of lens system 300. In various embodiments, temperature sensor 318 comprises a resistance temperature detector (RTD), a thermistor, a thermocouple, or any other appropriate type of temperature sensor. In various embodiments, temperature sensor 318 is mounted inside lens system 300, on lens system 300, in or on zoom lens 302, or any other appropriate location so as to measure the surrounding air temperature or surface temperature of the material to which temperature sensor 318 is mounted.

For example, lens system 300 and MWIR image sensor 306 are components of a camera mounted on a sentry tower that has detected an RFO (e.g., an RFO as detected by a radar unit mounted to the sentry tower). In response to receiving a temperature query from a camera service component of the sentry tower, temperature sensor 318 determines a temperature within lens system 300. The measured temperature is used by a processor (e.g., a processor in the sentry tower) along with radar data from the radar unit to determine an ideal focal setting for focus lens 304 (e.g., a position setting that is provided to focus motor 308). When focus lens 304 is in position, the camera unit is instructed (e.g., by a camera service component of the sentry tower) to generate two or more in-focus images of the RFO. In response to receiving the two or more in-focus images of the RFO, the camera service component of the sentry tower relays the images to a processor (e.g., a processor in the sentry tower) that generates a bounding box for each image of the RFO in the two or more images, and determines (i) an estimated position for the RFO in a future image, (ii) an estimated focus setting for focus lens 304, and/or (iii) an estimated position setting for zoom lens 310 so as to provide continued tracking of the RFO while maintaining focus (e.g., in response to receiving instructions from a system user that the RFO warrants continued monitoring and tracking). For example, an estimated focus lens setting is provided to focus motor 308 and an estimated zoom setting is provided to zoom motor 310.

In various embodiments, lens system 300 comprises more and/or different types of sensors, actuators, positioning motors, motor encoders, lenses, apertures, coatings, and/or other optical or optomechanical components appropriate to achieving a lens system design capable of imaging RFOs over a wide range of zoom settings (e.g., 15×, 20×, 25×, 30×, 35×, etc.) with a sufficient array of sensor pixels (e.g., 640×512 pixels, 1280×720 pixels, etc.) and pixel sizes (e.g., 12 micrometers (μm), 15 μm, etc.) to support identification and/or classification of a variety of distant RFOs (e.g., at a range of 2 kilometers (km), 2.5 km, 3 km, 5 km. etc.).

In some embodiments, lens system 300 includes a native auto-focus system with automatic sensing of objects close to lens system 300 and a manner of determining focus and adjustment of focal to achieve focus. In some embodiments, the auto-focus system is turned off because auto-focus is not sufficient for determining focus at long distances from lens system 300.

Figure 4:
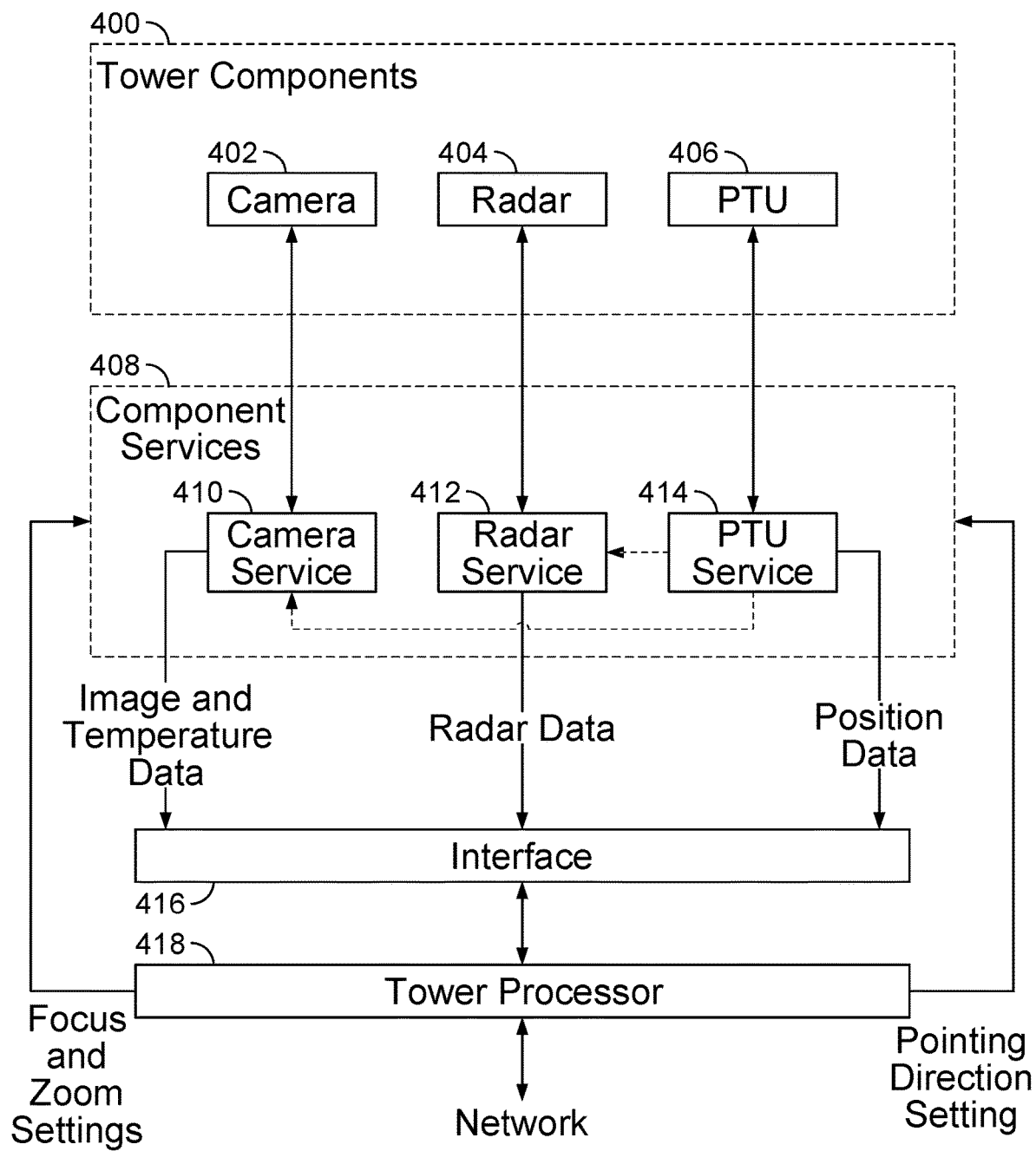
FIG. 4 is a block diagram illustrating an embodiment of a sentry tower system architecture.

FIG. 4 is a block diagram illustrating an embodiment of a sentry tower system architecture. In some embodiments, the sentry tower system architecture of FIG. 4 is used to implement the system architecture of sentry tower 102 of FIG. 1. In the example shown, the sentry tower system architecture of FIG. 4 comprises tower components 400, component services 408, interface 416, and tower processor 418. Tower components 400 comprise camera unit 402 (e.g., an MWIR camera), radar unit 404, and PTU 406. Component services 408 comprise camera service 410, radar service 412, and PTU service 414. In various embodiments, component services 408 are components of a computer mounted on or in a sentry tower (e.g., on the sentry tower PTU, in the sentry tower base, etc.). In various embodiments, component services 408 are components of a computer remote from the sentry tower (e.g., a computer that is part of a sentry monitoring system user system or server.

Camera service 410 provides services for camera unit 402 (e.g., receiving and/or processing raw data from camera unit 402 or issuing control commands to camera unit 402). In some embodiments, camera service 410 communicates with camera unit 402 via ethernet—for example, via a generic ethernet interface for cameras (i.e., Genicam). In various embodiments, camera service 410 communicates with camera unit 402 with any other appropriate wired or wireless communication method or protocol. In the example shown, camera service 410 provides image and temperature data and/or information to tower processor 418 via interface 416. In some embodiments, interface 416 is configured to receive an image taken using the focal setting for the lens system of camera unit 402 in the pointing direction for the lens system. In various embodiments, camera service 410 provides focal settings, zoom settings, or any other appropriate information about the status of camera unit 402 to tower processor 418 (e.g., to allow autonomous operation of the sentry tower and/or to provide information to a system user).

Radar service 412 provides services for radar unit 404 (e.g., receiving and/or processing raw data from radar unit 404 or issuing control commands to radar unit 404). In some embodiments, radar service 412 communicates with radar unit 404 via ethernet—for example, via a multi-branch, multi-waveform, broadband internet protocol (IP) software-defined radio (SDR) application for tactical communications (e.g., BNet). In various embodiments, radar service 412 communicates with radar unit 404 with any other appropriate wired or wireless communication method or protocol. In the example shown, radar service 412 provides radar data and/or information to tower processor 418 via interface 416 (e.g., a range-velocity map of an RFO is provided to tower processor 418). In various embodiments, radar service 412 provides transponder settings, controller settings, or any other appropriate information about the status of radar unit 404 to tower processor 418 (e.g., to allow autonomous operation of the sentry tower and/or to provide information to a system user).

PTU service 414 provides services for PTU 406 (e.g., receiving and/or processing raw data from PTU 406 or issuing motor control commands to PTU 406). In some embodiments, PTU service 414 communicates with PTU 406 via a universal serial bus (USB) interfaced to a controller area network (CAN) (i.e., USB CAN). In various embodiments, PTU service 414 communicates with PTU 406 with any other appropriate wired or wireless communication method or protocol. In the example shown, PTU service 414 provides PTU position data to tower processor 418 via interface 416 (e.g., PTU pointing direction data, such as polar angle and azimuth angle, or PTU motor encoder positions are provided to tower processor 418). In various embodiments, PTU service 414 provides PTU encoder settings, controller settings, or any other appropriate information about the status of PTU 406 to tower processor 418 (e.g., to allow autonomous operation of the sentry tower and/or to provide information to a system user). In the example shown, PTU service 414 also provides data to camera service 410 and radar service 412—for example, current PTU pointing direction data, prior or planned future PTU pointing directions, anticipated or actual rate of directional change made, etc.).

For example, tower components 400 (i.e., camera unit 402, radar unit 404, and PTU 406) are components of a sentry tower monitoring a geo-protected area, wherein radar unit 404 has detected an RFO. Radar unit 404 transmits radar data of the detected RFO to radar service 412 for processing (e.g., to convert raw radar data to a radar image stamped with a date, time, and location where the RFO was detected). Radar service 412 transmits the detected radar information to tower processor 418 via interface 416 for further processing. In response to receiving the detected radar information, tower processor 418 (e.g., a software program running on tower processor 418) initiates a query via camera service 410 to retrieve the current temperature and zoom setting of camera 402. For example, in response to the camera service query, a temperature sensor within camera 402 provides the current temperature to camera service 410 and a zoom lens motor encoder within the zoom lens system of camera 402 provides the current zoom lens position setting to camera service 410. The measured temperature and zoom lens setting are next provided to tower processor 418 by camera service 410. Along with the radar information previously received from radar service 412, tower processor 418 (e.g., a software program running on tower processor 418) determines an ideal focal setting for the lens system of camera 402 (e.g., a position setting is provided to the focus motor of the lens system of camera 402). When the focus lens of camera 402 is in position, camera 402 is instructed (e.g., by camera service 410) to generate two or more in-focus images of the RFO. In some embodiments, camera 402 is set to generate two or more in-focus images of the RFO of a fixed pixel size (e.g., 15 micrometers) and/or number of pixels (e.g., 125 pixels)—for example, based on the desired pixel size and/or number of pixels desired within a bounding box generated around the RFO image. In some embodiments, camera 402 is set to achieve its highest possible resolution. In various embodiments, camera 402 is set to achieve any other appropriate image resolution or format.

In response to receiving the two or more in-focus images of the RFO, camera service 410 relays the RFO images to tower processor 418 for further processing. In some embodiments, camera service 410 receives raw image data from camera 402 (e.g., from the MWIR sensor of camera 402) and processes the raw image data into a formatted image of the RFO along with image metadata (e.g., metadata comprising the time, date, and location of the obtained image, or any other appropriate image metadata). In response to receiving the RFO images from camera service 410, tower processor 418 generates a bounding box for each image of the RFO, and determines (i) an estimated position for the RFO in a future image, (ii) an estimated focus setting for the focus lens of camera 402, (iii) an estimated zoom setting for the zoom lens system of camera 402, and/or (iv) an estimated pointing direction for PTU 406 so as to provide continued tracking of the RFO while maintaining focus (e.g., in response to receiving instructions from a system user that the RFO warrants continued monitoring and tracking). For example, an estimated position setting is provided to the focus motor of the lens system of camera 402, an estimated zoom setting is provided to the zoom motor of the zoom lens system of camera 402, and/or an estimated pointing direction setting is provided to the motor encoders of PTU 406.

Figure 5:
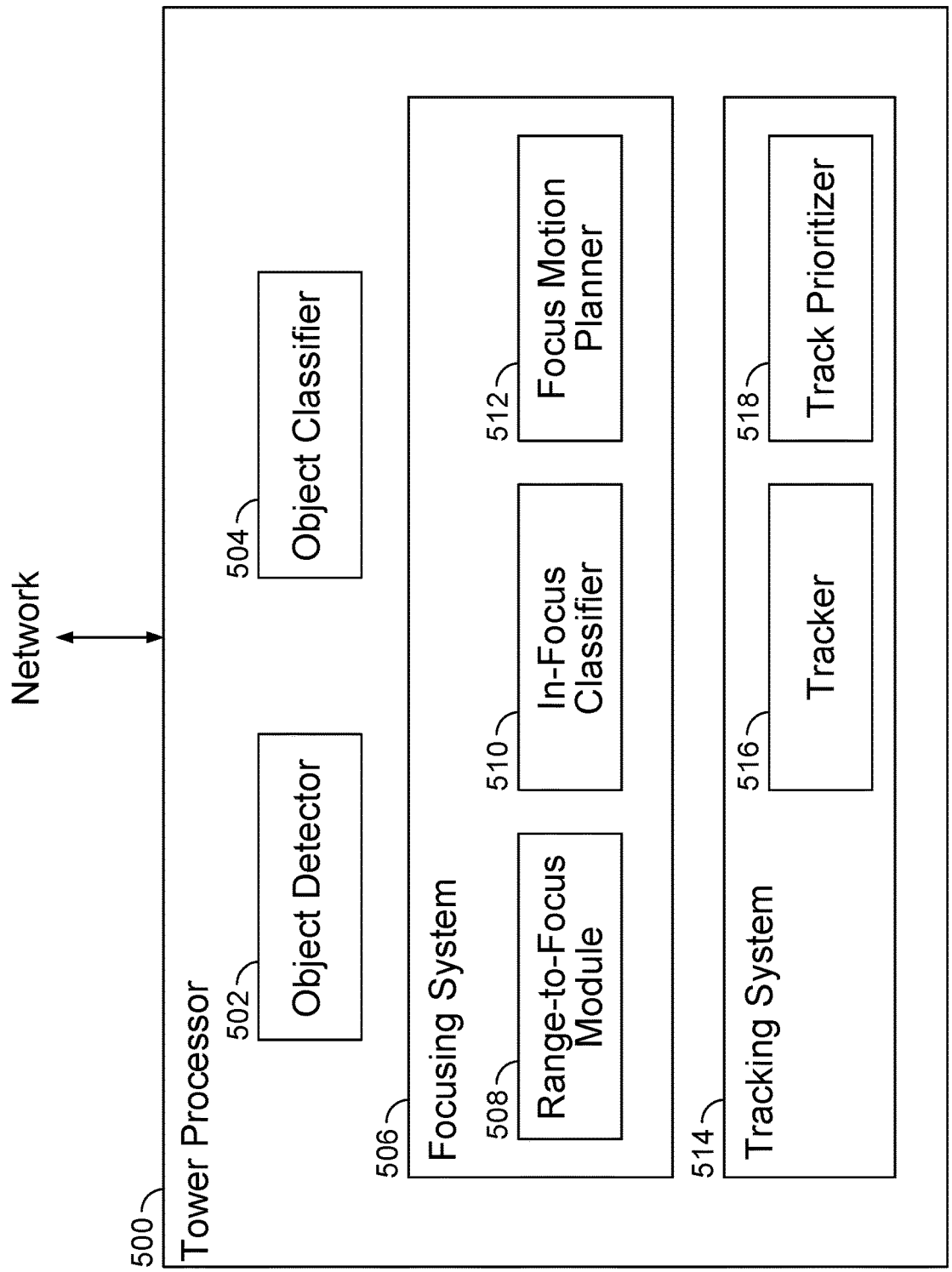
FIG. 5 is a block diagram illustrating an embodiment of a tower processor.

FIG. 5 is a block diagram illustrating an embodiment of a tower processor. In some embodiments, the tower processor architecture of FIG. 5 is used to implement the architecture of tower processor 208 of FIG. 2. In the example shown, tower processor comprises object detector 502, object classifier 504, focusing system 506, and tracking system 514. In various embodiments, object detector 502 and/or object classifier 504 use one or more neural network models to detect, identify, and/or classify RFOs (e.g., a convolutional neural network).

In various embodiments, object detector 502 uses one or more neural network models to detect RFOs in received camera images and/or radar images—for example, a convolutional neural network (CNN), a region-based convolutional neural network (R-CNN), a Fast R-CNN model, a Faster R-CNN model, a You Only Look Once (YOLO) model from the family of YOLO models, or any other appropriate neural network model.

Object detector 502 localizes one or more possible objects within a received image and determines bounding boxes for the one or more possible objects (e.g., using a bounding box model comprising a stochastic gradient descent algorithm that has been trained on a library of known RFO images using an adaptive learning rate). In some embodiments, object detector 502 determines bounding boxes for the one or more possible objects above a threshold level of confidence (e.g., above 50%, 60%, 70%, 85%, 92%, or any other appropriate level of confidence). In various embodiments, the bounding box model comprises one or more of a Tensor Flow model (e.g., a Tensor Flow application programming interface (API), a convolutional neural network, a region-based convolutional neural network (R-CNN), a Fast R-CNN model, a Faster R-CNN model, a You Only Look Once (YOLO) model from the family of YOLO models, an EdgeBoxes model, or any other appropriate bounding box model). In some embodiments, object detector 502 resizes images within a bounding box (e.g., to reduce computational overhead). In some embodiments, object detector 502 is trained using the intersection over union (IoU) method (i.e., the intersection of the computed bounding box with the bounding box for ground truth), with the IoU value set to an appropriate value corresponding to true positives, false positives, and false negatives (e.g., the IoU value is set to 0.5, 0.75, 0.9, 0.95, or any appropriate value). An IoU value of 1 implies that the predicted and the ground-truth bounding boxes perfectly overlap. For example, using an IoU value of $\geq 0.5$, the object detection is classified as a true positive (TP). In the event that the IoU value is <0.5, then the object detection is classified as a false positive (FP). In the event that the ground truth is present in the image and the model failed to detect the object, the object detection is classified as a false negative (FN). A true negative (TN) occurs for every part of the image where an object was not predicted, however since this is not useful for object detection, TN is ignored for the purpose of measuring model performance during training.

In some embodiments, precision and recall values are calculated and plotted (e.g., as 'PR curves') to evaluate the performance of the bounding box model (e.g., calculated from the number of true positives (TP), false positives (FP), and false negatives (FN) achieved while training the bounding box model). For example, precision and recall are calculated using the formulas Precision=TP/(TP+FP) and Recall=TP/(TP+FN). In some embodiments, object detector 502 is evaluated using the mean average precision (mAP) value (e.g., using a multi-point interpolated average precision). Operating object detector 502 at high recall values leads to a greater number of bounding boxes and false positives for a given image whereas high precision values lead to a lower number of bounding boxes but fewer false positives. In some embodiments, the point of operation for object detector 502 on the generated PR curves is determined empirically from test data used during training the system (e.g., object detector 502 is set to operate at >80% recall). In some embodiments, the point of operation for object detector 502 on the generated PR curves is globally set prior to system operation and is not dynamic. In some embodiments, the point of operation for object detector 502 on the generated PR curves is adjusted after further model training and/or evaluation under operational field conditions (e.g., to change the number of generated bounding boxes that require monitoring and evaluation).

Object classifier 504 assigns an object class label to the one or more possible objects outlined by a bounding box. In some embodiments, object classifier 504 uses sharp edge detection. In some embodiments, object classifier 504 uses machine learning approaches. For example, object classifier 504 uses one or more neural network models to classify possible RFOs that have been detected in received camera images and/or radar images. In various embodiments, the one or more neural network models used by object classifier 504 are the same, different, or a combination of same or different models as used by object detector 502. In some embodiments, image class labels comprise characteristics of the input image (e.g., texture, shape, or color aspects) that are summarized by numerical vectors (i.e., feature vectors). In some embodiments, the one or more neural network models are trained using hierarchical feature learning (i.e., 'layered learning'). For example, the first layers of the neural network model are trained to learn representations of basic (low-level) features, such as edges and corners. Further down the network, layers output representations of more specific features, corresponding to parts of the object (e.g., wheels, windows, eyes, beaks, etc.). After the last layer, the representations are high-level and allow a clear separation between different objects with the network having learned to distinguish among the different classes—for example, learning to distinguish among different RFO classes comprising major classes such as bird (e.g., distinguishing between a large raptor vs. an albatross), aircraft (e.g., distinguishing between a military vs. commercial aircraft), drone (e.g., distinguishing between a recreational vs. military drone), or learning to distinguish among different sub-classes (e.g., sub-classes of drone types). In some embodiments, object classifier 504 is trained to distinguish between various drone types and models—for example, various drone types and models comprising single-rotor drones, multi-rotor drones, fixed-wing drones, fixed-wing hybrid drones, small drones (e.g., a DJI Mavic Pro model drone), micro drones (e.g., the British military's Black Hornet drone), tactical drones (e.g., an RQ-11 Raven unmanned aerial vehicle), reconnaissance drones (e.g., an Israeli Aerospace Industries' Heron model drone), large combat drones (e.g., General Atomics MQ 1B Predator drone), non-combat large drones (e.g., Northrop Grumman's Global Hawk model drone), target and decoy drones (e.g., a Beechcraft MQM 107E Streaker drone), GPS drones (e.g., a DJI Phantom 4 GPS drone), photography drones, racing drones, firefighting drones (e.g., Drone Amplified's Ignis model drone), etc.

Focusing system 506 comprises range-to-focus module 508, in-focus classifier 510, and focus motion planner 512. Range-to-focus module 508 estimates the lens position for ideal focus based on three input variables: target distance (e.g., as determined from the radar data), zoom lens position (e.g., based in part on the radar data and/or based in part on a radar cross section of the RFO from the radar data), and temperature of the focus system inside the camera enclosure. In some embodiments, the estimated lens position is provided to the focus lens motor of the camera.

In various embodiments, determining the focal setting is based on a look up table, a calculation, and/or a zoom setting. For example, focus curves are generated prior to system operation for a variety of test targets, target distances, target radar cross sections, camera focal settings, zoom settings, and/or camera temperatures. In some embodiments, the focus curves comprise continuous plots of focus quality vs. focal setting (e.g., focus quality vs. focus motor encoder position) generated from images of each test target taken under a variety of sentry monitoring system operating conditions—for example, images of each test target are taken at a number of distances appropriate to the monitoring range of the sentry monitoring system (e.g., a monitoring range of 10 m to 3 km or any other appropriate monitoring range), for a variety of temperatures appropriate to the operating environment of the sentry monitoring system (e.g., −10° C. to 40° C. or any other appropriate temperature range), and for a variety of radar cross sections and camera zoom settings appropriate to the selected camera and radar units of the sentry monitoring system. In some embodiments, focus quality of an image is measured by an edge detection algorithm (e.g., by using edge intensity as measured by a Sobel filter based algorithm). In various embodiments, focus quality is assessed by quality measures comprising structural content (SC), mean square error (MSE), peak signal to noise ratio (PSNR), normalized cross-correlation (NCC), average difference (AD), maximum difference (MD), normalized absolute error (NAE), or any other appropriate image quality measure. In some embodiments, focus quality is assessed by a human user (e.g., based on the focus setting that most often allows for correct identification and classification of the test target).

In various embodiments, the generated focus curves are averaged together to provide a single focus curve for the sentry monitoring system for a given camera temperature, or range of camera temperatures, as a function of target distance (i.e., a range-to-focus curve). In some embodiments, discrete values (e.g., corresponding to ideal focus) are extracted from the generated focus curves to create a lookup table—for example, a lookup table that is used by a computer program to determine the best focus setting with which to generate a camera image of an RFO at a detected distance (e.g., as detected by the radar unit of the tower monitoring system) and for a given camera temperature.

In-focus classifier 510 receives an image—for example, receives a camera image directly from the camera service or a bounding box image as determined by object detector 502—and predicts the degree to which the image is in focus. In some embodiments, the predictions are continuous numerical values. In some embodiments, the predictions are discrete categories (e.g., no-focus, out-of-focus, and in-focus). In various embodiments, images received by in-focus classifier 510 are the entire image as taken by the camera, or a smaller region of interest as determined by the camera service and/or object detector 502. In various embodiments, images received by in-focus classifier 510 are unprocessed images or processed images (e.g., processed images that have been cropped, re-formatted, re-sized, compressed, reduced in resolution, or any other appropriate processing).

In some embodiments, in-focus classifier 510 is a neural network. In some embodiments, in-focus classifier 510 is based on edge detection (e.g., Sobel edge detection). In various embodiments, the output of in-focus classifier 510 is transmitted over the network, and/or displayed to a system user.

In some embodiments, an image dataset is classified and labeled with one of three image quality classifications: no focus (e.g., it is undetermined whether there is an object in the image dataset or not), out of focus (e.g., there is an object in the image dataset that is not in ideal focus), and in focus (e.g., there is an object in the image dataset that is in ideal focus). In various embodiments, an image dataset is classified using more than three image quality classifications—for example, based on a continuous or discrete set of image quality metrics (e.g., based on edge intensity as measured by a Sobel filter based algorithms).

In some embodiments, Sobel filter based edge detection is used to determine ideal focus of an image, wherein the image is convolved with X and Y-direction kernels to generate edge values (e.g., SobelX and SobelY edge values). In some embodiments, in response to an edge value being less than a threshold percentage of confidence (e.g., 60%, 70%, 78%, 82%, etc.), the object is classified as no focus. In some embodiments, in response to an edge value being greater than a threshold percentage of confidence (e.g., 82%, 89%, 93%, etc.), the object is classified as in focus. In some embodiments, in response to an edge value being within a range of confidence values (e.g., 60-65%, 72-78%, etc.), the object is classified as out of focus.

In various embodiments, methods used to determine ideal focus of an image comprise one or more of the following: focus measures based on first-order differentiation, second-order differentiation, an image histogram, image statistics (e.g., threshold pixel count, variance of the distribution of luminance or grayscale values of the image, etc.), focus measures based on correlation or based on data compression, or any other appropriate focus measure. In various embodiments, focus measure operators are used to assess the quality of the various focus measures (e.g., gradient based operators, Laplacian based operators, wavelet based operators, statistics based operators, discrete cosine transform (DCT) based operators, or any other appropriate focus measure operator.

In response to determining that the image is not in ideal focus (e.g., in response to in-focus classifier 510 classifying the image as no focus or out of focus), focus motion planner 512 determines how to move the focus lens over the next few seconds. If the target is not in focus, focus motion planner 512 scans the focus lens in a range near the position proposed by range-to-focus module 508. When in-focus classifier 510 deems the focus to be satisfactory, the focus lens motion plan is terminated. At a later time, if the focus becomes unsatisfactory, focus motion planner 512 is invoked again. In some embodiments, the focus motion plan generated by the focus motion planner is observable to a user who is monitoring a video feed (e.g., a video feed from the camera unit).

In some embodiments, to provide for the most-rapid autonomous system operation (i.e., automatically and rapidly acquiring, identifying, and classifying an in-focus RFO image) all three subsystems of the RFO auto-focus system processor are enabled and work concurrently (i.e., the range-to-focus module, the in-focus classifier, and the focus motion planner).

In various embodiments, one or more of the subsystems are disabled—for example, intentionally disabled (e.g., turned off to conserve power) or unintentionally disabled (e.g., due to a subsystem malfunction). In some embodiments, the focal setting is determined with a subsystem of the lens system turned off. For example, in the event that the range-to-focus module is disabled, the focus motion planner will search a much wider range of focus lens positions; or in the event that the focus motion planner and in-focus classifier are disabled, the range-to-focus module is used to control the focus lens position. Both these examples provide for continued system operation in the event that one of the subsystems is disabled, though at the cost of a slower system response time compared to when all three subsystems of the RFO auto-focus system processor are enabled and work concurrently.

Tracking system 514 comprises tracker module 516 and track prioritizer 518. In some embodiments, tracker module 516 receives location data from object detector 502 (e.g., the location of the RFO within bounding boxes generated from two or more RFO images and the corresponding GPS locations). While object detector 502 provides a rough estimate of RFO location, tracker module 516 generates an improved estimate of RFO location and is also used to predict where the object is headed (i.e., tracker module 516 predicts a future trajectory). In response to determining the future trajectory of the RFO, tracker module 516 determines an estimated focus setting, zoom setting, and/or PTU pointing direction for the camera lens system to maintain the RFO in the camera field of view.

In some embodiments, an optical flow model is used for small and smooth camera motion (e.g., by adding location offsets to RFO images produced at a previous PTU 'pose', wherein a PTU pose is the current position of the PTU at any point in time). In some embodiments, the optical flow model is seeded with an initial estimate of RFO location (e.g., an initial estimate provided by object detector 502). In some embodiments, three-dimensional location data is used to seed the optical flow model. In some embodiments, the optical flow model uses a pixel-based gradient descent approach when comparing a first image to a next image and adds in any motion offset due to the PTU motion.

In some embodiments, tracker 516 uses a median flow algorithm (e.g., a Gauss-Newton algorithm) to predict where the object is headed based on previous image locations. This is useful for instances when the RFO moves large distances between bounding box images from one frame to a next frame (e.g., the RFO moves from an upper corner in one frame to the middle of the frame in the next frame due to a low camera frame rate, a high velocity RFO, and/or due to rapid PTU motion). In some embodiments, the prediction is verified by back projecting the predicted trajectory through the model to ensure that the prediction converges back to its point of origin.

In the event that tracker module 516 is unable to maintain the RFO in the camera field of view, tracker module 516 initiates a search program to reacquire the RFO. In various embodiments, the search program comprises a search strategy that changes the focal setting, the zoom setting, and/or the pointing direction of a camera's lens system. In some embodiments, the focal setting is based at least in part on the radar range distance. In some embodiments, determining the focal setting is based at least in part on a look up table, a calculation, or a zoom setting. In various embodiments, the search strategy is a pre-determined search strategy stored in computer memory, a search strategy based on the last known position of the RFO, a search strategy as determined by a system operator, or any other appropriate search strategy.

In some embodiments, reacquiring tracking of the RFO includes changing a zoom setting outward. In some embodiments, changing the zoom setting outward occurs in response to a range of the object being less than a threshold range (e.g., a range as measured by a radar unit). For example, a threshold range where the entirety of the RFO image is maintained within the camera's field of view (FOV), a threshold range that produces a desired proportion of FOV area to RFO image area or FOV area to RFO bounding box area (e.g., 1:1, 1.3:1, 1.5:1, 2:1, 3:1, etc.), a threshold range corresponding to a fixed number of pixels for an RFO image relative to its bounding box (e.g., 64, 128, 256, etc.), or any other appropriate threshold range. In some embodiments, reacquiring tracking includes not changing a zoom setting outward. In some embodiments, not changing the zoom setting outward occurs in response to a range of the object being more than or equal to a threshold range.

In some embodiments, reacquiring an image of the RFO includes changing a focal setting. In some embodiments, the focal setting for the lens is determined by scanning in one direction and then in another direction. For example, the focal setting is changed continuously or in discrete steps starting at the last known position of best focus. After each discrete step, or periodically during a continuous lens sweep, focus is measured and determined to be getting or worse (e.g., focus is evaluated by the in-focus classifier subsystem). In response to determining that the focus is getting better, the focal setting is adjusted to move the focal lens in the direction of improving focus until ideal focus is achieved. In response to determining the focus is getting worse, the focal setting is adjusted to move the focal lens in the opposite direction of declining focus until ideal focus is achieved. In some embodiments, determining ideal focus comprises a series of focal settings that move through the ideal focus to produce a plot of focus quality versus focal setting. In some embodiments, the focal setting provided to the lens systems comprises the focal setting that produces a maximum focus quality.

In some embodiments, tracker module 516 directs a PTU on the sentry tower to scan the pointing direction of the attached camera using a search strategy (e.g., up and down, left and right, in concentric spirals, squares, circles, etc.). In various embodiments, the pointing direction is changed in a search pattern for the object comprising one of the following: a spiral, a square spiral, a raster, an up-down sweep that alternates left of center and right of center, a Z-shaped pattern, or any other appropriate pattern.

In some embodiments, track prioritizer 518 decides whether to continue tracking the RFO. In some embodiments, the decision whether to continue tracking the RFO is made by a human operator of the system.

In some embodiments, in response to the RFO being identified as a bird or commercial aircraft (i.e., not a threat), track prioritizer 518 is programmed to ignore the RFO, and move to the next RFO on its list. In various embodiments, the track priority list of track prioritizer 518 is prioritized based on the size, speed, range, altitude, location, or any other appropriate ranking of RFO priority. In some embodiments, the track priority list is pre-programmed prior to system operation. In some embodiments, the track priority list is updated during system operation (e.g., automatically updated due to a changing threat level within the geo-protected area, manually updated by a human user, etc.).

In some embodiments, a track can 'die' based on a time-out (e.g., five to ten seconds of not detecting an RFO via either radar or camera). In some embodiments, when a track dies, track prioritizer 518 instructs tracker module 516 to move to a next priority RFO if available. In some embodiments, in response to a next priority RFO not being available, track prioritizer 518 instructs tracker module 516 to return to its system default setting (e.g., RFO scanning mode).

Figure 6:
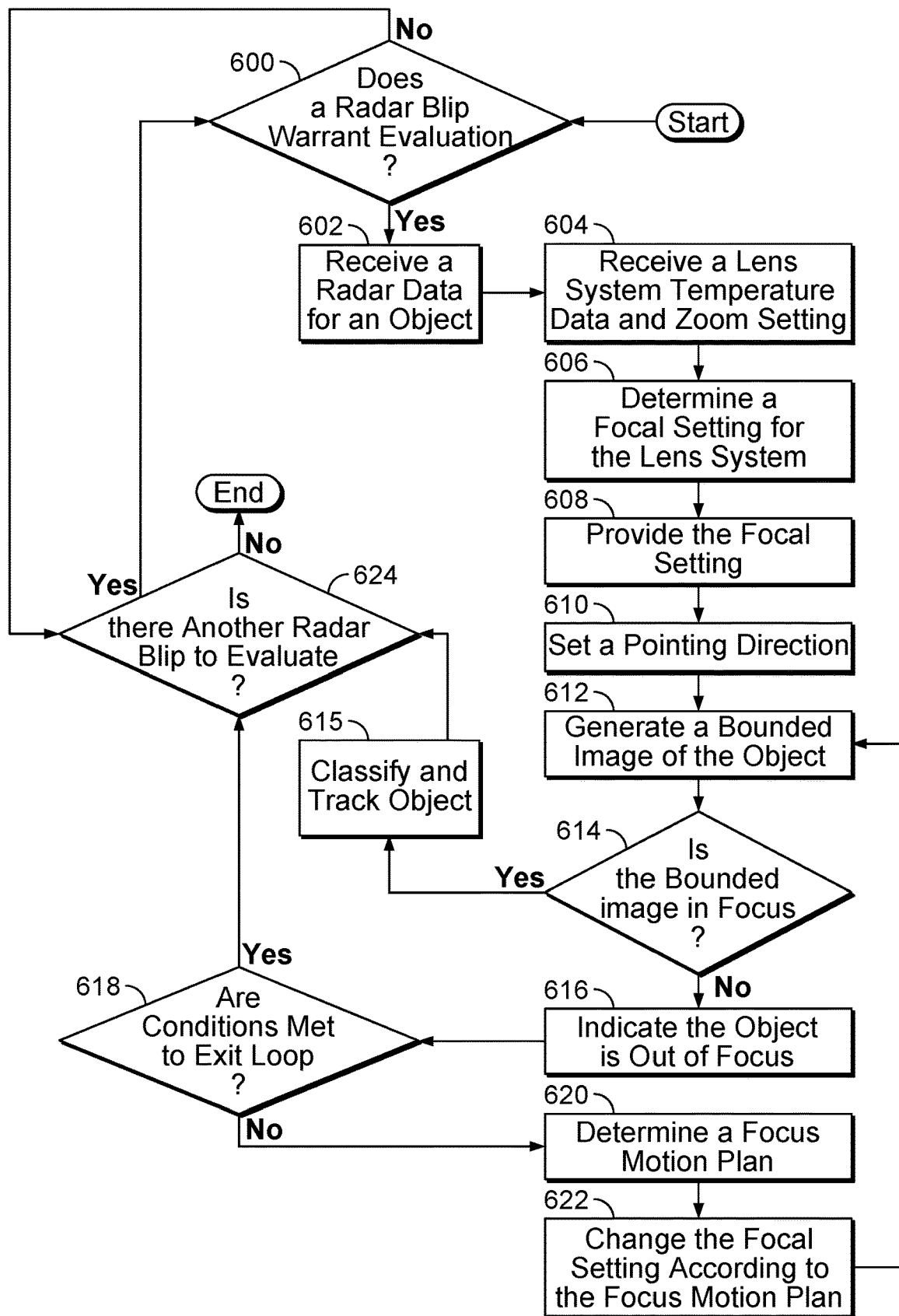
FIG. 6 is a flow diagram illustrating an embodiment of a method for automatically acquiring focus of a remote flying object.

FIG. 6 is a flow diagram illustrating an embodiment of a method for automatically acquiring focus of a remote flying object. In various embodiments, the process of FIG. 6 is executed using server processor 108 of FIG. 1 and/or using a processor of sentry tower 102 of FIG. 1. In the example shown, the process of FIG. 6 is used by a sentry monitoring system (e.g., the sentry monitoring system of FIG. 1) to monitor for an RFO via a sentry tower, and in response to receiving a radar data and a lens temperature data from the sentry tower, determine a focal setting for a lens system (e.g., a lens system mounted on the sentry tower) based at least in part on the radar data and the lens temperature data, and provide the focal setting for the lens system.

In 600, it is determined whether a radar blip warrants evaluation. For example, there are many different effects that cause unknown targets to appear on a radar when objects are not actually at those locations—for example, a multiple-reflection beam path, a multiple-trip echo, a corner reflector, a side lobe blip, tall objects on the ground, ships on the water, ground clutter, weather, radar jammers, chaff and window, interference from electrical and electronic devices, interference from another radar set on the same frequency, anomalous propagation, and increased gain objects. In various embodiments, a system user (e.g., an experienced radar operator) determines whether a radar blip warrants evaluation, a machine learning algorithm that is trained to identify radar blips that warrant evaluation (e.g., a machine learning algorithm running on the sentry tower processor), or any appropriate combination of the two methods. In response to determining that the radar blip does not warrant evaluation, control passes to 624.

In response to determining that the radar blip warrants evaluation, the process flows to 602. In 602, a radar data for an object is received. For example, radar data comprising a radar range distance, an azimuth angle, and an elevation angle of an RFO are received from a radar service. In 604, a lens system temperature data and zoom setting are received. For example, a temperature from within a lens system enclosure and a camera zoom setting are received from a camera service. In 606, a focal setting is determined for the lens system. For example, a range-to-focus module within a sentry tower processor determines a focal setting for the camera lens system. In 608, the focal setting is provided. For example, the range-to-focus module provides the focal setting to the camera service. In 610, a pointing direction is set. For example, a tracker module within the sentry tower processor instructs a PTU service to set a pointing direction of the camera lens system. In 612, a bounded image of the object is generated. For example, the camera lens system acquires an image of the RFO, the camera service processes the image for transmission to an object detector within the sentry tower processor, and the object detector generates an image of the RFO within a bounding box (i.e., a bounded image of the RFO is generated).

In 614, it is determined whether the bounded image is in focus. For example, an in-focus classifier within the sentry tower processor determines whether the bounded image of the RFO is in focus. In some embodiments, determining whether the bounded image of the RFO is in focus comprises classifying the focus quality (e.g., in focus, no focus, or out of focus, or any other appropriate measure of focus quality). In response to determining that the bounded image is in focus, the control passes to 615. In 615, the object is classified and tracked. For example, the object as visible in the in focus image is classified and tracked. In various embodiments, the tracking is performed until the object tracking has been lost (e.g., the object is no longer in the image), times out, another RFO is to be tracked, or any other appropriate reason to terminate tracking. Upon termination of tracking, control passes to 624. In response to determining that the bounded image is not in focus, the process flows to 616.

In 616, it is indicated that the object is out of focus. For example, in response to determining that the bounded image of the RFO is out of focus, it is indicated to a focus motion planner within the sentry tower processor that the object is out of focus. In some embodiments, in response to the in-focus classifier determining a focus quality other than in-focus, it is indicated that the object is out of focus.

In 618, it is determined whether conditions are met to exit the loop. For example, a program running in the sentry tower processor determines whether (i) a time-out threshold has been reached prior to achieving an in-focus condition (e.g., a time-out threshold of five to ten seconds of not detecting an RFO via either radar or camera, or any other appropriate time-out threshold, has been reached); (ii) a maximum number of focus attempts have been made without achieving an in-focus condition; or (iii) any other appropriate set of conditions have been met to exit the loop. In response to determining that conditions are met to exit the loop, control passes to 624. In response to determining that conditions are not met to exit the loop, the process flows to 620.

In 620, a focus motion plan is determined. For example, the focus motion planner within the sentry tower processor determines how to move the focus lens over the next few seconds. For example, it is determined to move the focus lens (i) in a range near a position indicated by the range-to-focus module; (ii) in discrete steps or in a continuous scan; (iii) first in one direction away from the current focus setting then, in the event that focus has not been achieved, in the other direction; (iv) alternating in small steps on one side of the current focus setting, then the other side; or in any other appropriate focus motion plan. In 622, the focal setting is changed according to the focus motion plan. For example, the focal setting of the camera lens system is changed according to the focus motion plan. In response to the focal setting of the camera lens system being changed, control passes to 612 and a next bounded image of the object is generated. In 614, it is determined whether the next bounded image is in focus. In response to determining that the next bounded image is in focus, control passes to 624.

In 624, it is determined whether there is another radar blip to evaluate. In response to determining that there is another radar blip to evaluate, control passes back to 600. For example, it is determined by a system user and/or a machine learning algorithm that there is another radar blip to evaluate, and control passes back to 600. In response to determining that there is not another radar blip to evaluate, the process ends.

Figure 7:
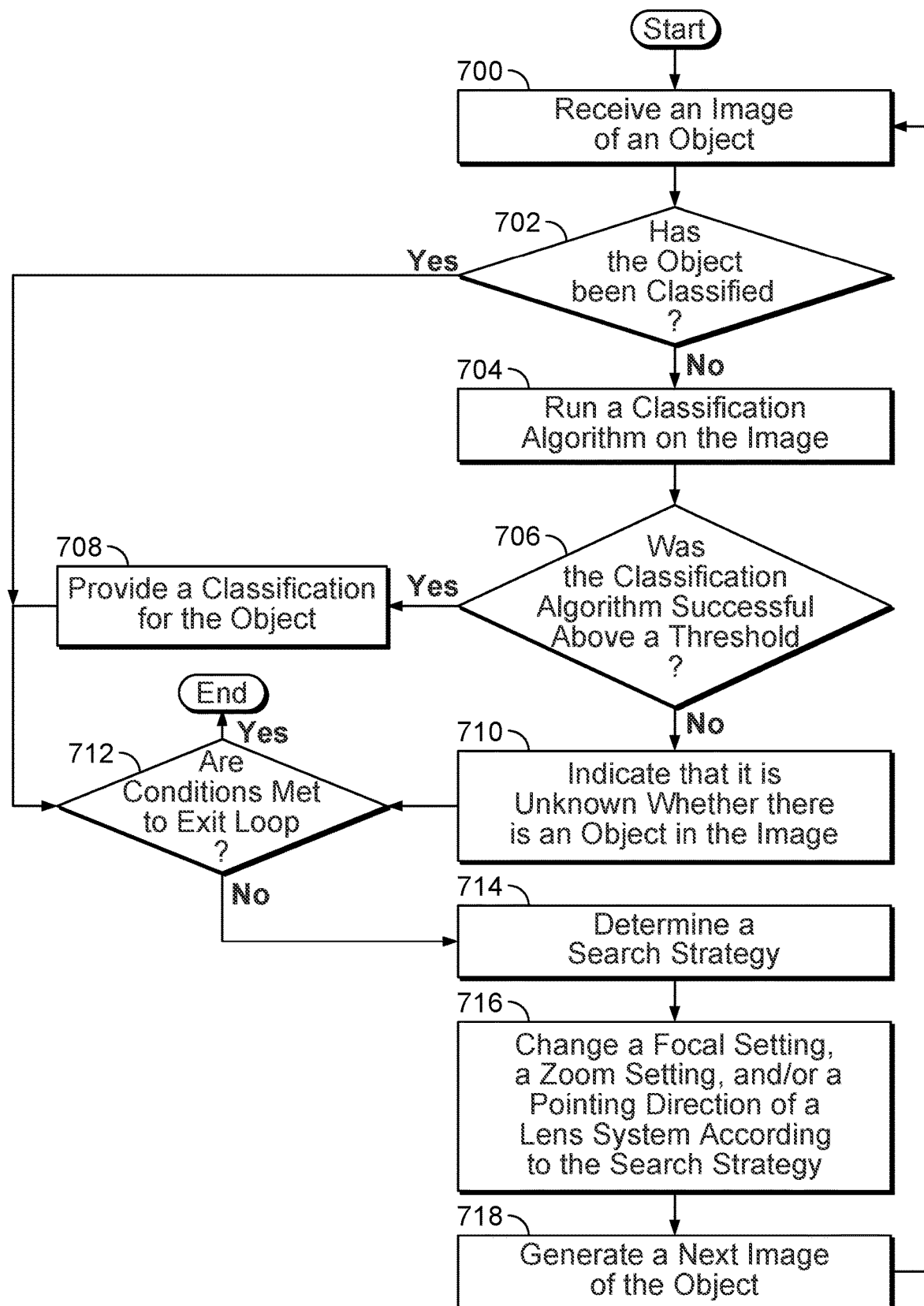
FIG. 7 is a flow diagram illustrating an embodiment of a method for classifying and tracking a remote flying object while automatically maintaining focus.

FIG. 7 is a flow diagram illustrating an embodiment of a method for classifying and tracking a remote flying object while automatically maintaining focus. In some embodiments, the process of FIG. 7 is used to implement 615 of FIG. 6. In various embodiments, the process of FIG. 7 is executed using server processor 108 of FIG. 1 and/or using a processor of sentry tower 102 of FIG. 1. In the example shown, the process of FIG. 7 is used by a sentry monitoring system (e.g., the sentry monitoring system of FIG. 1) to classify and track an RFO via a sentry tower, and in response to receiving two or more images (e.g., two or more RFO images) determine (i) a bounding box for an object in the two or more images, (ii) an estimated position for the object in a future image, and (iii) an estimated focus setting and an estimated pointing direction for a lens system.

In 700, an image of an object is received. For example, a bounded image of an object (e.g., an in focus image) is received by an object classifier module within a sentry tower processor. In 702, it is determined whether the object has been classified. For example, the object classifier module, or another computer program running in the tower processor, determines whether the object has been classified with an RFO class label (e.g., it is determined that the RFO is an RQ-11 Raven unmanned aerial vehicle). In response to determining that the object has been classified, control passes to 712. In response to determining that the object has not been classified, the process flows to 704.

In 704, a classification algorithm is run on the image. For example, a machine learning classification algorithm that has been trained to distinguish among various RFO different classes is run on a bounded image of the RFO. In 706, it is determined whether the classification algorithm was successful above a threshold. For example, it is determined whether the machine learning classification algorithm was successful in classifying the RFO above a threshold level of confidence (e.g., 82%, 89%, 93%, or any other appropriate threshold level of confidence). In response to determining that the classification algorithm was not successful above a threshold, control passes to 710. In response to determining that the classification algorithm was successful above a threshold, the process flows to 708.

In 708, a classification is provided for the object. For example, a classification comprising major RFO classes such as bird, aircraft, drone, or different sub-classes (e.g., different sub-classes of aircraft or drone types) is provided to a computer program running on the tower processor and/or to a system user. In 710, it is indicated that it is unknown whether there is an object in the image. For example, it is indicated to a computer program running on the tower processor and/or to a system user that it is unknown whether there is an object in the image.

In 712, it is determined whether conditions are met to exit the loop. For example, a program running in the sentry tower processor determines whether (i) a time-out threshold has been reached for tracking the RFO (e.g., a time-out threshold of five to ten seconds of not detecting the RFO via either radar or camera, or any other appropriate time-out threshold, has been reached); (ii) another RFO should be tracked (e.g., an RFO that has been elevated to a higher priority threat level); (iii) a maximum number of classification and/or tracking attempts have been made without success; or (iv) any other appropriate set of conditions have been met to exit the loop. In response to determining that conditions are met to exit the loop, the process ends. In response to determining that conditions are not met to exit the loop, the process flows to 714.

In 714, a search strategy is determined. For example, a search strategy to reacquire or maintain the RFO within the camera field of view (FOV) is determined. In various embodiments, the search strategy comprises changing the camera focal setting, the camera zoom setting, and/or the PTU pointing direction (e.g., up and down, left and right, an up-down sweep that alternates left of center and right of center, a raster, in concentric spirals, squares, circles, etc.). In 716, a focal setting, a zoom setting, and/or a pointing direction of a lens system is changed according to the search strategy. For example, a focal setting, a zoom setting, and/or a pointing direction of the camera lens system is changed in step-wise increments according to the search strategy. In 718, a next image of the object is caused to be generated. For example, a next image of the object is generated using an incremental change to the camera focal setting, zoom setting, and/or camera pointing direction, and control passes back to 700.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    an interface configured to:
        receive a radar data;
        receive a lens temperature data; and
    a processor configured to:
        determine a focal setting for a lens system based at least in part on the radar data and the lens temperature data;
        provide the focal setting for the lens system;
        receive an image taken using the focal setting for the lens system;
        determine whether there is an object in the image;
        in response to a determination that there is an object in the image:
            determine whether the object is in focus; and
            in response to a determination that the object is in focus:
                indicate that the object is in focus; and
                classify and track the object, comprising to:
                    train a model using inputted features of the object, wherein the model implements a neural network technique;
                    output, using the trained model, parts of the object; and
                    determine, based on the outputted parts, whether the object is a threat object or a non-threat object, wherein the non-threat object corresponds with an albatross, a commercial aircraft, or a recreational drone, and wherein the threat object corresponds with a raptor, a military aircraft, or a military drone;
        determine whether there is an object in the image that is not in focus;
        in response to a determination that an object in the image that is not in focus, indicate that the object is not in focus; and
        change the focal setting for the lens system until the object is in focus in response to determining that the image is not in focus, wherein the focal setting for the lens is determined by scanning in one direction and then in another direction.

2. The system of claim 1, wherein the radar data comprises a radar range distance.

3. The system of claim 2, wherein determining the focal setting is based at least in part on the radar range distance.

4. The system of claim 1, wherein determining the focal setting is based at least in part on a look up table, a calculation, or a zoom setting.

5. The system of claim 1, wherein the radar data comprises an azimuth angle and an elevation angle.

6. The system of claim 5, wherein a pointing direction is set for the lens system based at least in part on the azimuth angle and the elevation angle.

7. The system of claim 1, wherein determining that the object in the image is in focus uses a neural network classifier or an edge detection algorithm.

8. A system, comprising:
    an interface configured to:
        receive a radar data;
        receive a lens temperature data; and
    a processor configured to:
        determine a focal setting for a lens system based at least in part on the radar data and the lens temperature data;
        provide the focal setting for the lens system;
        receive an image taken using the focal setting for the lens system;
        determine whether there is an object in the image;
        in response to a determination that there is an object in the image:
            determine whether the object is in focus; and
            in response to a determination that the object is in focus:
                indicate that the object is in focus; and
                classify and track the object, comprising to:
                    train a model using inputted features of the object, wherein the model implements a neural network technique;
                    output, using the trained model, parts of the object; and
                    determine, based on the outputted parts, whether the object is a threat object or a non-threat object, wherein the non-threat object corresponds with an albatross, a commercial aircraft, or a recreational drone, and wherein the threat object corresponds with a raptor, a military aircraft, or a military drone; and
        in response to a determination that it is unable to determine that there is an object in the image, indicate that it is unknown to determine that there is the object in the image.

9. The system of claim 8, wherein the processor is further configured to change the focal setting of the lens system in response to a determination that it is unable to determine that there is an object in the image.

10. The system of claim 8, wherein the processor is further configured to change a zoom setting of the lens system in response to a determination that it is unable to determine that there is an object in the image.

11. The system of claim 10, wherein the processor is further configured to change a pointing direction of the lens system in response to a determination that it is unable to determine that there is an object in the image.

12. The system of claim 11, wherein the pointing direction is changed in a search pattern for the object comprising one of the following: a spiral, a square spiral, a raster, an up-down sweep that alternates left of center and right of center, or a Z-shaped pattern.

13. A method, comprising:
   receiving a radar data;
   receiving a lens temperature data;
   determining, using a processor, a focal setting for a lens system based at least in part on the radar data and the lens temperature data;
   providing the focal setting for the lens system;
   receiving an image taken using the focal setting for the lens system;
   determining whether there is an object in the image;
   in response to a determination that there is an object in the image:
      determining whether the object is in focus; and
      in response to a determination that the object is in focus:
         indicating that the object is in focus; and
         classifying and tracking the object, comprising:
            training a model using inputted features of the object, wherein the model implements a neural network technique;
            outputting, using the trained model, parts of the object; and
            determining, based on the outputted parts, whether the object is a threat object or a non-threat object, wherein the non-threat object corresponds with an albatross, a commercial aircraft, or a recreational drone, and wherein the threat object corresponds with a raptor, a military aircraft, or a military drone;
   determining whether there is an object in the image that is not in focus;
   in response to a determination that an object in the image that is not in focus, indicating that the object is not in focus; and
   changing the focal setting for the lens system until the object is in focus in response to determining that the image is not in focus, wherein the focal setting for the lens is determined by scanning in one direction and then in another direction.

14. A computer program product embodied in a non-transitory computer readable medium and comprising computer instructions for:
   receiving a radar data;
   receiving a lens temperature data;
   determining, using a processor, a focal setting for a lens system based at least in part on the radar data and the lens temperature data;
   providing the focal setting for the lens system;
   receiving an image taken using the focal setting for the lens system;
   determining whether there is an object in the and image;
   in response to a determination that there is an object in the image:
      determining whether the object is in image; and
      in response to a determination that the object is in focus:
         indicating that the object is in focus; and
         classifying and tracking the object, comprising:
            training a model using inputted features of the object, wherein the model implements a neural network technique;
            outputting, using the trained model, parts of the object; and
            determining, based on the outputted parts, whether the object is a threat object or a non-threat object, wherein the non-threat object corresponds with an albatross, a commercial aircraft, or a recreational drone, and wherein the threat object corresponds with a raptor, a military aircraft, or a military drone;
   determining whether there is an object in the image that is not in focus;
   in response to a determination that an object in the image that is not in focus, indicating that the object is not in focus; and
   changing the focal setting for the lens system until the object is in focus in response to determining that the image is not in focus, wherein the focal setting for the lens is determined by scanning in one direction and then in another direction.

15. A method, comprising:
   receiving a radar data;
   receiving a lens temperature data;
   determining, using a processor, a focal setting for a lens system based at least in part on the radar data and the lens temperature data;
   providing the focal setting for the lens system;
   receiving an image taken using the focal setting for the lens system;
   determining whether there is an object in the image;
   in response to a determination that there is an object in the image:
      determining whether the object is in focus; and
      in response to a determination that the object is in focus:
         indicating that the object is in focus; and
         classifying and tracking the object, comprising:
            training a model using inputted features of the object, wherein the model implements a neural network technique;
            outputting, using the trained model, parts of the object; and
            determining, based on the outputted parts, whether the object is a threat object or a non-threat object, wherein the non-threat object corresponds with an albatross, a commercial aircraft, or a recreational drone, and wherein the threat object corresponds with a raptor, a military aircraft, or a military drone; and
   in response to a determination that it is unable to determine that there is an object in the image, indicate that it is unknown to determine that there is the object in the image.

16. A computer program product embodied in a non-transitory computer readable medium and comprising computer instructions for:
   receiving a radar data;
   receiving a lens temperature data;
   determining, using a processor, a focal setting for a lens system based at least in part on the radar data and the lens temperature data;
   providing the focal setting for the lens system;
   receiving an image taken using the focal setting for the lens system;
   determining whether there is an object in the image;

in response to a determination that there is an object in the image:
  determining whether the object is in focus; and
  in response to a determination that the object is in focus:
    indicating that the object is in focus; and
    classifying and tracking the object, comprising:
      training a model using inputted features of the object, wherein the model implements a neural network technique;
      outputting, using the trained model, parts of the object; and
      determining, based on the outputted parts, whether the object is a threat object or a non-threat object, wherein the non-threat object corresponds with an albatross, a commercial aircraft, or a recreational drone, and wherein the threat object corresponds with a raptor, a military aircraft, or a military drone; and
in response to a determination that it is unable to determine that there is an object in the image, indicate that it is unknown to determine that there is the object in the image.

* * * * *